US011199319B2

(12) United States Patent
Yu

(10) Patent No.: US 11,199,319 B2
(45) Date of Patent: Dec. 14, 2021

(54) HARDSCAPE FIXTURES AND DEPLOYMENT

(71) Applicant: Wangs Alliance Corporation, Port Washington, NY (US)

(72) Inventor: Rong Feng Yu, Brooklyn, NY (US)

(73) Assignee: Wangs Alliance Corporation, Port Washington, NY (US)

( * ) Notice: Subject to any disclaimer, the term of this patent is extended or adjusted under 35 U.S.C. 154(b) by 0 days.

(21) Appl. No.: 17/071,338

(22) Filed: Oct. 15, 2020

(65) Prior Publication Data

US 2021/0131626 A1 May 6, 2021

Related U.S. Application Data

(60) Provisional application No. 62/923,597, filed on Oct. 20, 2019.

(51) Int. Cl.
| | |
|---|---|
| *F21V 21/02* | (2006.01) |
| *F21V 23/06* | (2006.01) |
| *F16M 13/02* | (2006.01) |
| *F21V 23/00* | (2015.01) |
| *F21S 8/02* | (2006.01) |
| *H01R 13/52* | (2006.01) |
| *H05B 45/20* | (2020.01) |
| *F21K 9/20* | (2016.01) |
| *E04F 13/074* | (2006.01) |
| *F21S 8/00* | (2006.01) |
| *F21V 15/01* | (2006.01) |

(Continued)

(52) U.S. Cl.
CPC ............ *F21V 23/06* (2013.01); *E04F 13/074* (2013.01); *F16M 13/02* (2013.01); *F21K 9/20* (2016.08); *F21S 8/02* (2013.01); *F21S 8/036* (2013.01); *F21V 15/01* (2013.01); *F21V 21/02* (2013.01); *F21V 23/003* (2013.01); *H01R 13/5219* (2013.01); *H05B 45/20* (2020.01); *E04F 2290/026* (2013.01); *F21Y 2115/10* (2016.08); *H01R 13/502* (2013.01)

(58) Field of Classification Search
CPC ....................................... F21V 21/02
See application file for complete search history.

(56) References Cited

U.S. PATENT DOCUMENTS

| | | |
|---|---|---|
| 4,449,167 A | 5/1984 | Cohen |
| 5,480,315 A | 1/1996 | Martinelli |
| (Continued) | | |

*Primary Examiner* — Vip Patel
(74) *Attorney, Agent, or Firm* — Weiss & Arons LLP

(57) ABSTRACT

Apparatus and methods for deploying a fixture. The apparatus may include, and the methods may involve, apparatus for mounting a fixture in a hardscape. The apparatus may include a mount. The mount may include an anchor. The anchor may be configured to be secured to the hardscape. The apparatus may include a support. The support may be fixed to the anchor. The support may be configured to hold the fixture. The apparatus may include a connector. The connector may be configured to releasably connect to an electrical terminal of the fixture. Connection of the connector to the fixture may form a watertight enclosure about the terminal. The connector may include a casing defining a groove. The connector may include an elastomeric ring disposed in the groove. The connector may be configured to prevent movement of the connector relative to the support.

30 Claims, 21 Drawing Sheets

(51) Int. Cl.
   *H01R 13/502* (2006.01)
   *F21Y 115/10* (2016.01)

(56) References Cited

U.S. PATENT DOCUMENTS

| | | |
|---|---|---|
| 6,726,348 B2 | 4/2004 | Gloisten |
| 7,234,846 B2 | 6/2007 | Chen |
| 2002/0191391 A1 | 12/2002 | Van Etten |
| 2006/0193151 A1* | 8/2006 | Quan ................. F21V 23/06 |
| | | 362/640 |
| 2008/0112171 A1 | 5/2008 | Patti et al. |
| 2009/0296410 A1 | 12/2009 | Patti |
| 2013/0033865 A1 | 2/2013 | Vinther et al. |
| 2015/0260356 A1 | 9/2015 | Beausoleil |
| 2018/0144668 A1 | 5/2018 | Gow |

* cited by examiner

HARDSCAPE FIXTURES AND DEPLOYMENT

CROSS-REFERENCE TO RELATED APPLICATIONS

This is a nonprovisional of Provisional Application No. 62/923,597, filed Oct. 20, 2019, which is hereby incorporated herein in its entirety.

BACKGROUND

Fixtures are often included as part of a hardscape, e.g. a wall or walkway of stone or concrete used in landscape architecture. Fixtures in walls or walkways are typically are hardwired to cables that run through or under a wall capstone. Typically, because of the hardwiring, the electrical connection is made prior to installation of a piece of the hardscape, e.g. a capstone of a wall, and the piece of hardscape removed if the fixture needs to be changed or replaced. This is because, to gain access to wires when replacing, repairing or changing a fixture in such hardwired implementations, a capstone or other object often needs to be removed and the electrical connection to the new fixture completed. The capstone or other piece of hardscape material covering or otherwise obscuring the connection and/or wiring then normally needs to be replaced.

In many cases the capstone or other object used to hide or obscure the wiring and/or connection to fixture is glued or cemented in place making removal and replacement difficult and sometimes damaging to the piece of hardscape.

Therefore, it would be desirable to provide a fixture that can be mounted to or removed from the a hardscape without having to construct, reconstruct or deconstruct hardscape in which a powerline is embedded, or without requiring cutting or stripping of the powerline.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
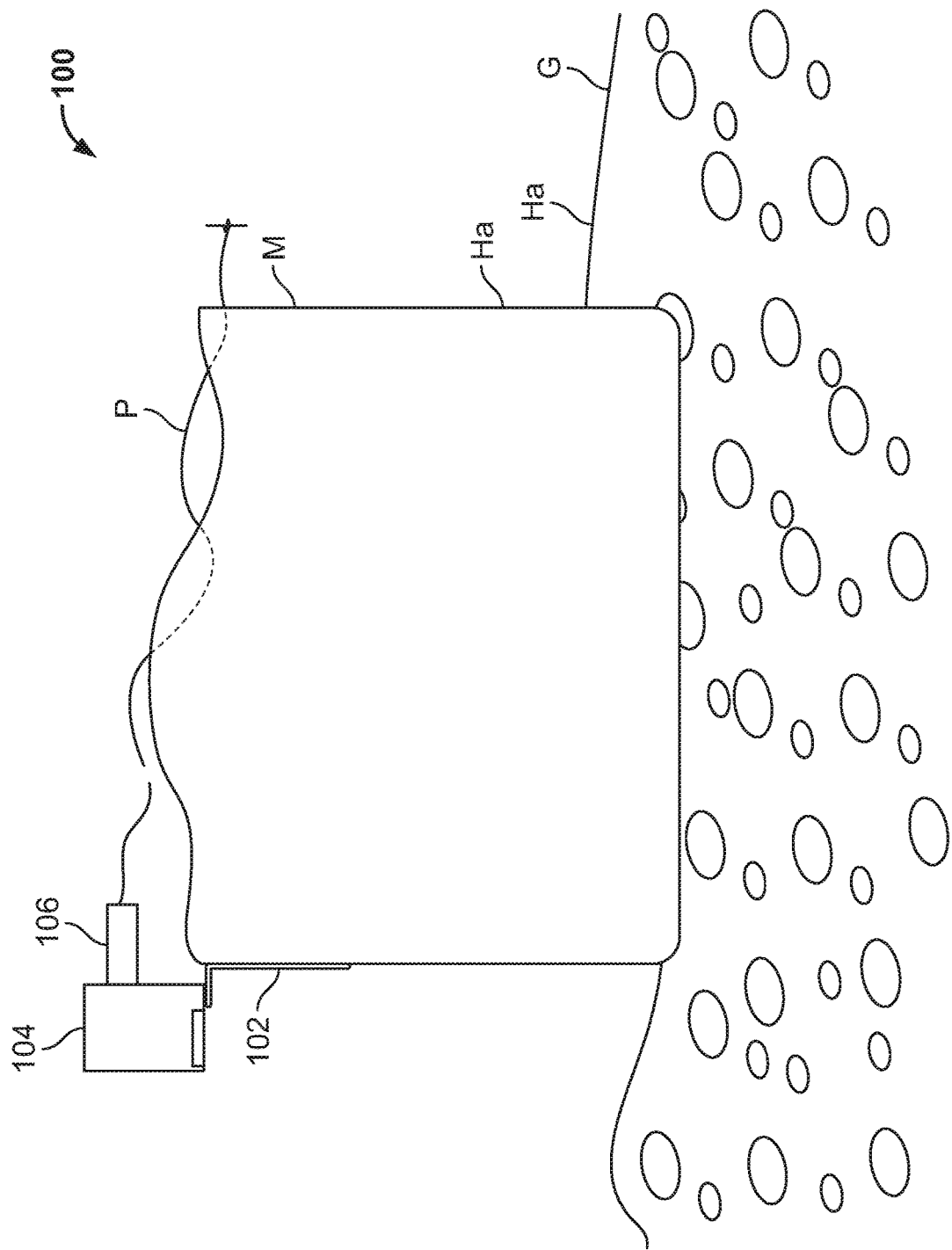
FIG. 1 shows illustrative apparatus in accordance with principles of the invention.

Apparatus and methods for deploying a fixture are provided.

The apparatus may include, and the methods may involve, apparatus for mounting a fixture in a hardscape.

The apparatus may include a mount. The mount may include an anchor. The anchor may be configured to be secured to the hardscape. The anchor may include stainless steel. The apparatus may include a support. The support may be fixed to the anchor. The support may be configured to hold the fixture. The apparatus may include a connector. The connector may be configured to releasably connect to an electrical terminal of the fixture.

In the event that the fixture needs to be removed from the mount, the connector may be left engaged in the mount when the fixture is removed from the mount.

The connector may form a union with a corresponding receptacle on the fixture. The connector may be engaged by the support. The receptacle may be affixed to the fixture. The receptacle may be engaged by the support. The connector may be affixed to the fixture.

Connection of the connector to the fixture may form a watertight enclosure about the terminal. The fixture may have an IP66 weatherproof rating when the connector is connected to the fixture.

The connector may include a casing defining a groove. The connector may include an elastomeric ring disposed in the groove.

The watertight enclosure may include one or more gaskets that are, operationally, disposed between the casing and a receptacle in the fixture.

The connector may be configured to engage the support. The connector may be configured to prevent movement of the connector relative to the support.

The connector may define a longitudinal axis. The connector may include a detent. The detent may be configured to prevent, in operation, the connector from being displaced, relative to the support, along the axis.

The detent may include a flange. The connector may define a groove. The groove may be configured to receive an edge of the support. The support may define a receptacle. The detent may include a boss. The boss may be configured to enter the receptacle when the connector is disposed in the support. The boss may be configured to prevent the connector from rotating about the longitudinal axis. The boss may be configured to prevent the connector from translating along a plane that is perpendicular to the longitudinal axis.

The hardscape may include masonry. The anchor may be configured to be secured, at the masonry, to the masonry.

The hardscape may include ground. The anchor may be configured to be secured, at the ground, to the ground.

The anchor may be configured to be secured to the masonry between a first course and a second course.

The support may include a brace. The brace may be fixed to the anchor. The brace may be configured to be disposed along a face of the second course. The brace may define an opening. The opening may be configured to receive the connector.

The support may include a fixture shelf. The fixture shelf may be fixed to the anchor. The fixture shelf may be configured to extend away from a face of the second course.

The mount may be monolithic.

The masonry may have an external surface. The anchor may be configured to be secured, at the external surface, to the external surface. The masonry may include a first course. The external surface may include an underside of the first course. The first course may include a cap stone.

The support may include a support end. The anchor may include a clip. The clip may be configured to retain the support end relative to the external surface. The clip may include a first arm. The clip may include a second arm. The second arm may be fixed to the first arm. The second arm may, in operation, extend between the underside and the support end. The support end may be rotatable relative to the second arm.

The support may define a rotation axis. The support may be configured to be rotated about the rotational axis to different positions. For each of the positions, there may be a corresponding attitude of the fixture. The support may be configured to hold the fixture at the attitude.

The support may be configured to be secured to the connector. The connector may be configured to secure the fixture to the support.

The connector may be configured to secure the fixture to the support via the releasable connection. In operation, the releasable connection alone may secure the fixture to the support.

The support may define an opening. The opening may be configured to receive the connector.

The casing may define a male portion. The male portion may be configured to plug in to a female receptacle defined in the fixture.

Deinstallation of the fixture may be a deinstallation that does not require severing a power line. The deinstallation may be a deinstallation that does not require removal of the first course. The deinstallation may be a deinstallation that does not require de-securing the anchor from the masonry.

The anchor may be configured to be secured in a bed between a first course and a second course of the masonry. The first course may include a cap stone. The anchor may include a horizontal layer. The horizontal layer may include a plate. The horizontal layer may include a sheet. The sheet may include an expanded sheet. The sheet may include a metal fabric.

The horizontal layer may define an opening. The opening may be configured to receive bonding material that may be configured to bond the first course to the second course. the opening may be of a plurality of openings that are configured to receive the bonding material.

The bed may include bonding material that may be configured to bond the first course to the second course. The material may include mortar. The material may include adhesive. The anchor may be configured to be secured to the masonry without a fastener. The hardscape may include ground. The hardscape may include ground covering. The hardscape may include earth. The hardscape may include pavement.

The apparatus may include the fixture. The fixture may be a light fixture. Table 1 lists illustrative fixtures.

TABLE 1

Illustrative fixtures.

Light emitting diode ("LED") light
LED landscape light
Spot light
Flood light
Inground light
Tape light
Deck light
Step light
Linear light
Pathway light
Fan
Audio speaker
Video monitor
Camera
Any other suitable fixture The apparatus may include, and the methods may involve, apparatus configured to be mounted in a hardscape.

The apparatus may include a fixture housing. The fixture housing may include end faces. The end faces may be configured to be engaged by first fasteners. The fixture housing may include a top face. The top face may be configured to be engaged by a second fastener. The fixture housing may include a bottom face. The bottom face may be configured to be engaged by a third fastener. The apparatus may include an electrical terminal. The electrical terminal may be configured to be releasably connected to a power connector.

The fixture housing may be configured to be secured to a mount: by the first fastener; and not by the second fastener; and not by the third fastener.

The fixture housing may be configured to be secured to a mount: by the second fastener; and not by the first fastener; and not by the third fastener.

The fixture housing may be configured to be secured to a mount: by the third fastener; and not by the first fastener; and not by the second fastener.

The fixture housing may define a through-hole from the bottom face to the top face. The third fastener may be configured to traverse the through-hole and engage masonry in the hardscape.

The fixture housing may house a light fixture. The light fixture may include a light emitting diode (LED). The LED may have a brightness. The brightness may be adjustable while the fixture housing is installed at the masonry. The light fixture may include a user control for adjusting the brightness. The brightness user control may be exposed on an outside face of the light fixture housing.

The LED may have a coordinated color temperature (CCT). The CCT may be adjustable while the fixture housing is installed at the masonry. The light fixture may include a user control for adjusting the CCT. The CCT user control may be exposed on an outside face of the fixture housing.

Illustrative embodiments in accordance with the principles of the invention will now be described with reference to the accompanying drawings, which form a part hereof. It is to be understood that other embodiments may be utilized and that structural, functional and procedural modifications or omissions may be made without departing from the scope and spirit of the present invention. Some embodiments may omit features shown and/or described in connection with the illustrative apparatus. Some embodiments may include features that are neither shown nor described in connection with the illustrative apparatus. Features of illustrative apparatus may be combined. For example, one illustrative embodiment may include features shown in connection with another illustrative embodiment.

FIG. 1 shows illustrative arrangement 100 for providing a fixture in a hardscape. Arrangement 100 may include mount 102. Arrangement 100 may include fixture 104. Arrangement 100 may include connector 106. Fixture 104 may be deployed in hardscape Ha. Powerline P may provide electrical power to the fixture. Powerline P may have a segment disposed in masonry M. Hardscape Ha may include masonry M. Hardscape Ha may include ground G.

Figure 2:
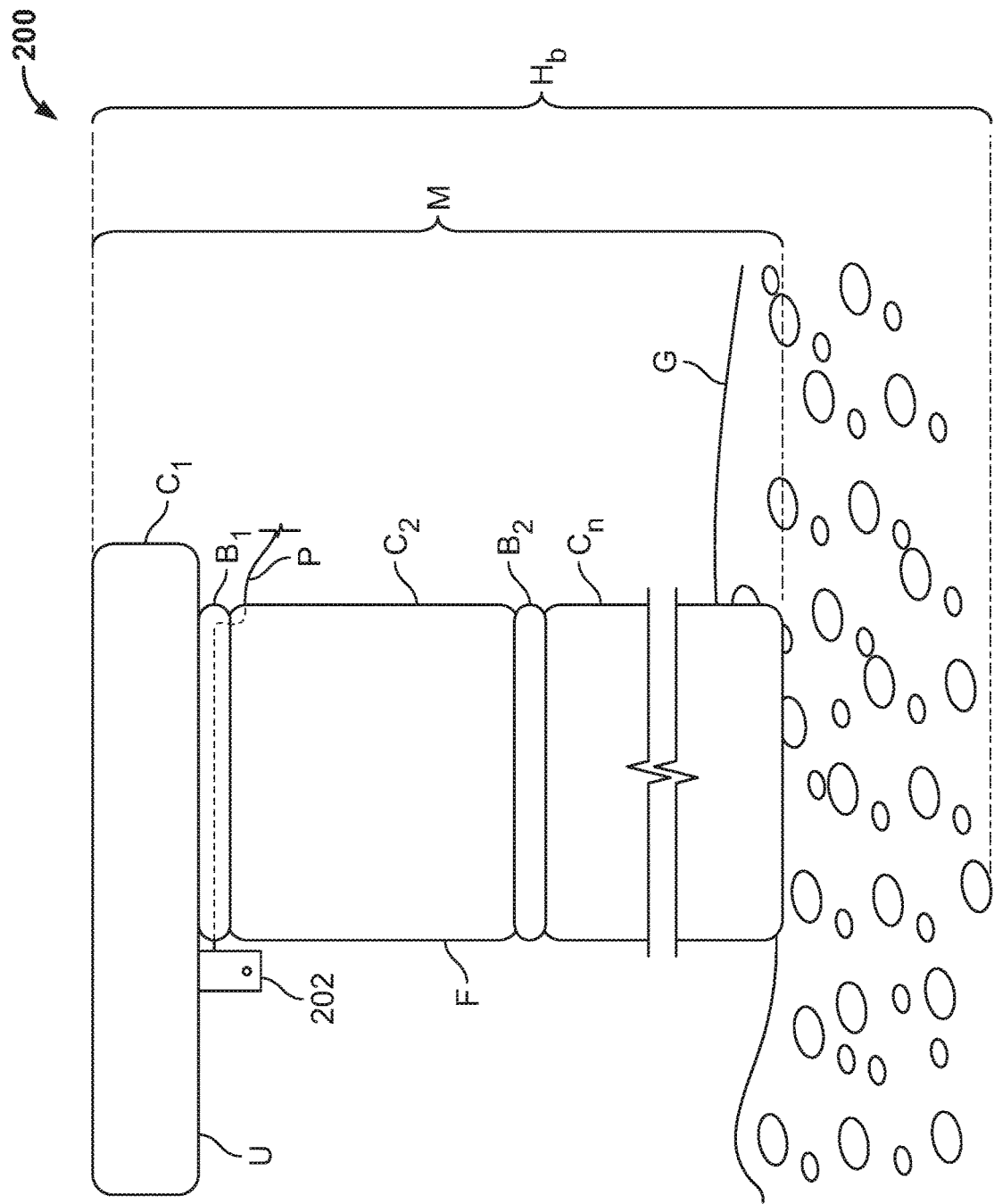
FIG. 2 shows illustrative apparatus in accordance with principles of the invention.

FIG. 2 shows illustrative arrangement 200 for providing a fixture in a hardscape. Arrangement 200 may include anchor 202. Anchor 202 may be included in a mount such as mount 102 (shown in FIG. 1). Anchor 202 may be attached to underside U of course $C_1$. Course $C_1$ may include a capstone. Masonry M may include face F.

Arrangement 200 may include a fixture (not shown). The fixture may have one or more features in common with fixture 104 (shown in FIG. 1). Arrangement 200 may include a connector (not shown). The connector may have one or more features in common with connector 106 (shown in FIG. 1). The fixture may be deployed in hardscape $H_b$. Hardscape $H_b$ may include masonry M. Masonry M may include first course $C_1$. Masonry M may include bed $B_1$. Masonry M may include second course $C_2$. Masonry M may include bed $B_2$. Masonry M may include further courses $C_n$. Hardscape Hb may include ground G. Hardscape Hb may have one or more features in common with hardscape Ha (shown in FIG. 1).

Figure 3:
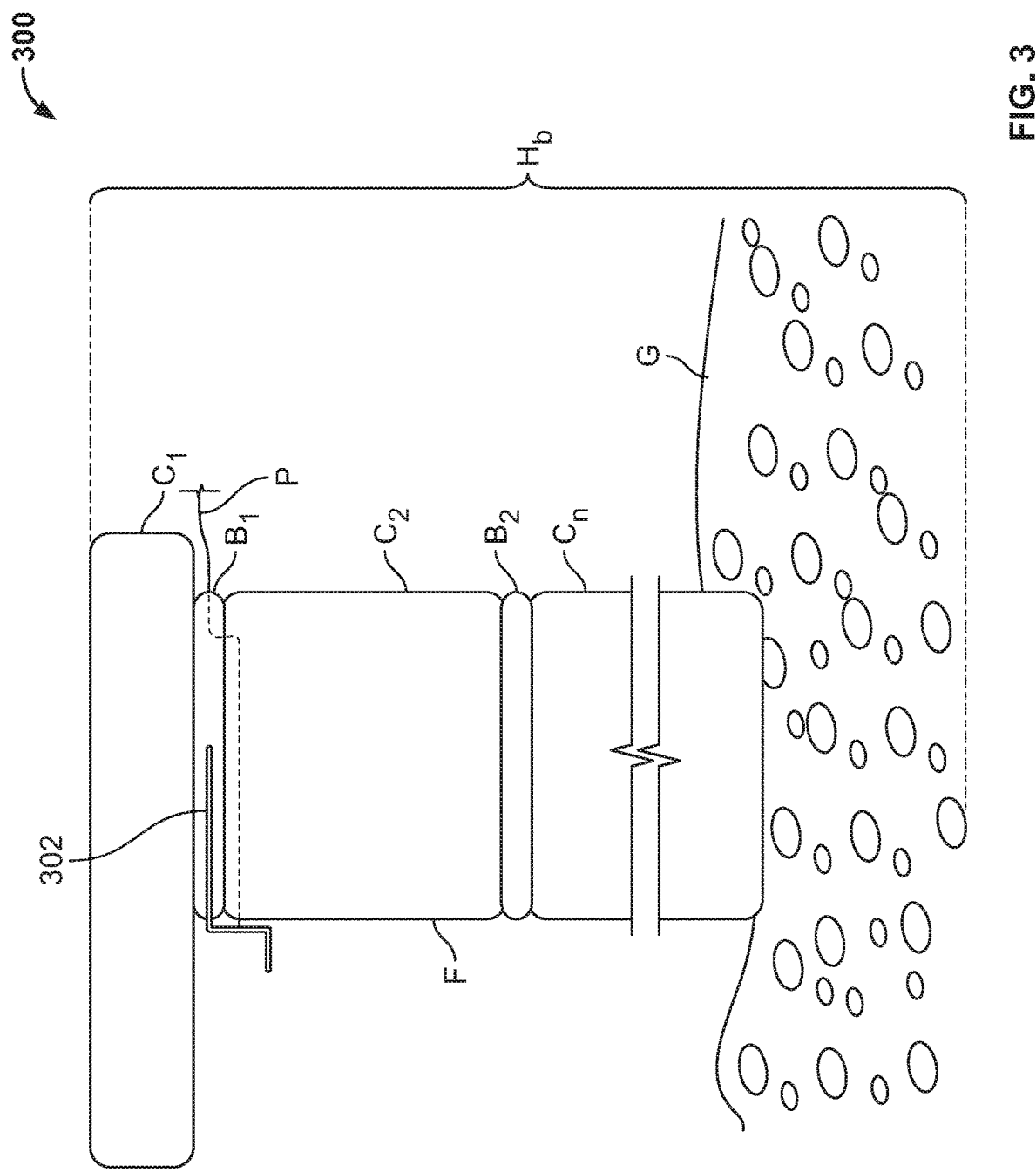
FIG. 3 shows illustrative apparatus in accordance with principles of the invention.

FIG. 3. shows illustrative arrangement 300 for providing a fixture in a hardscape. Arrangement 300 may include anchor 302. Anchor 302 may be part of a mount such as mount 102 (shown in FIG. 1). Anchor 302 may be bonded between course $C_1$ and course $C_2$. Anchor 302 may be bonded in bed $B_1$.

Arrangement 300 may include a fixture (not shown). The fixture may have one or more features in common with fixture 104 (shown in FIG. 1). Arrangement 300 may include a connector (not shown). The connector may have one or more features in common with connector 106 (shown in FIG. 1). The fixture may be deployed in hardscape $H_b$. Hardscape $H_b$ may include masonry M. Masonry M may include first course $C_1$. Masonry M may include bed $B_1$. Masonry M may include second course $C_2$. Masonry M may include bed $B_2$. Masonry M may include further courses $C_n$. Hardscape $H_b$ may include ground G. Hardscape $H_b$ may have one or more features in common with hardscape Ha (shown in FIG. 1).

Figure 4:
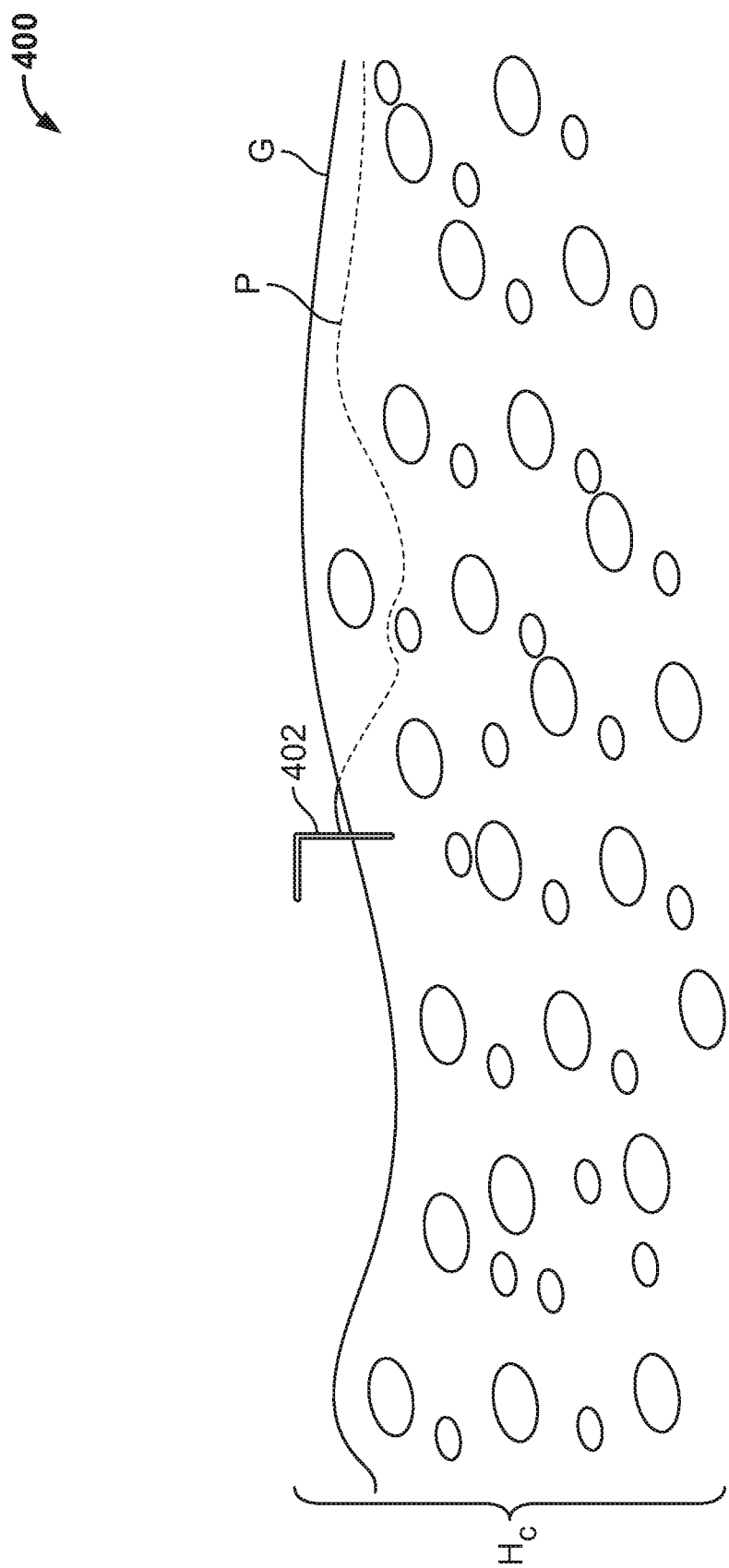
FIG. 4 shows illustrative apparatus in accordance with principles of the invention.

FIG. 4. shows illustrative arrangement 400 for providing a fixture in a hardscape. Arrangement 400 may include anchor 402. Anchor 402 may be part of a mount such as mount 102 (shown in FIG. 1). Anchor 402 may be supported by ground G. Anchor 402 may be sunk in ground G.

Arrangement 400 may include a fixture (not shown). The fixture may have one or more features in common with fixture 104 (shown in FIG. 1). Arrangement 400 may include a connector (not shown). The connector may have one or more features in common with connector 106 (shown in FIG. 1). The fixture may be deployed in hardscape Hc. Hardscape Hc may include ground G. Hardscape Hc may have one or more features in common with hardscape Ha (shown in FIG. 1).

Figure 5:
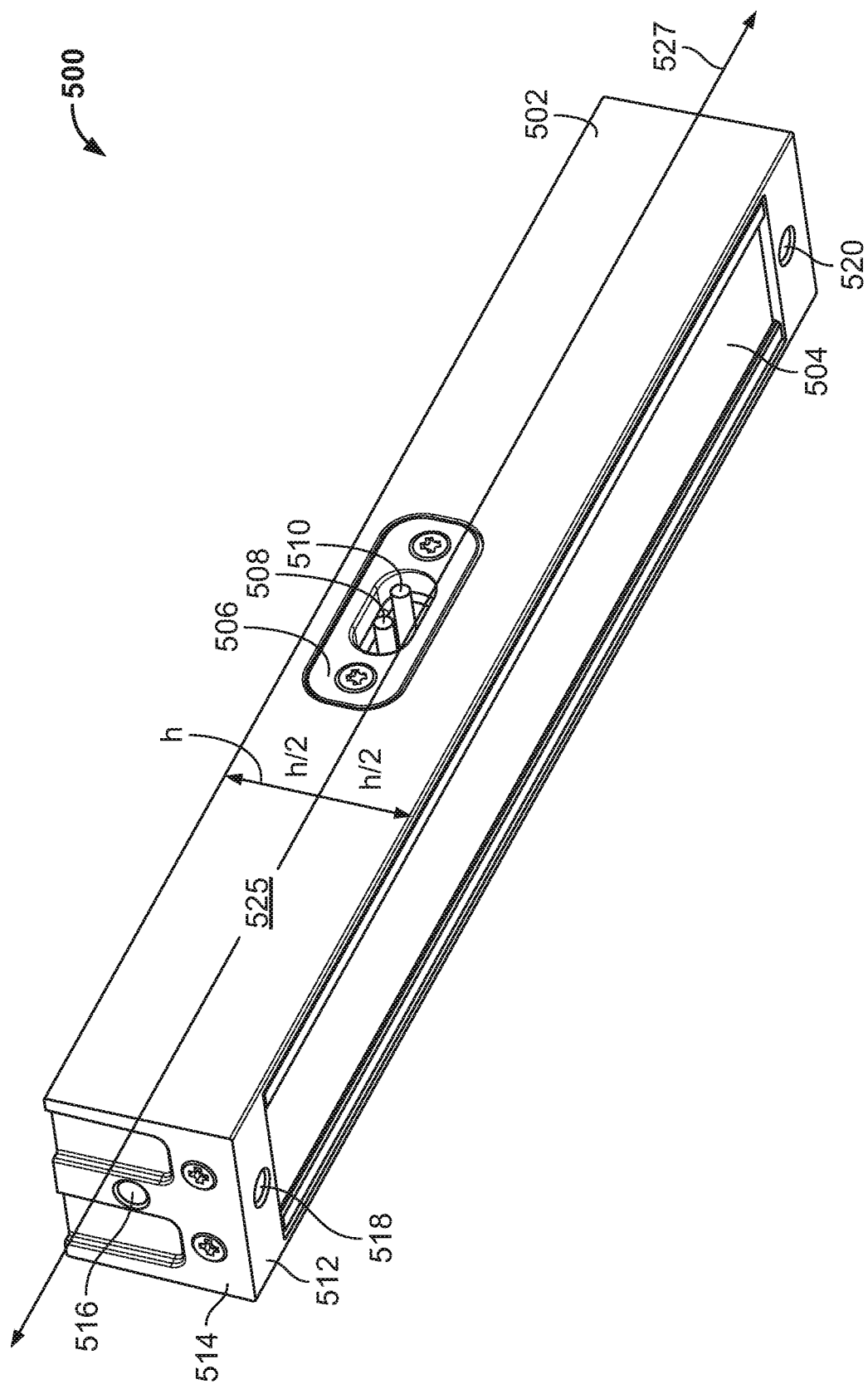
FIG. 5 shows illustrative apparatus in accordance with principles of the invention.

FIG. 5 shows illustrative fixture 500. Fixture 500 may include housing 502. Housing 502 may house an LED light (not shown). The LED light may include one or more LED emitters. Fixture 500 may include panel 504. Panel 504 may transmit light from the LED light. Fixture 500 may include receptacle 506. Fixture 500 may include electrical terminals 508 and 510. Electrical terminals 508 and 510 may be recessed in receptacle 506.

Fixture 500 may include bottom face 512. Fixture 500 may include end face 514. End face 514 may include mounting hole 516. Bottom face 512 may include mounting hole 518. Bottom face 512 may include mounting hole 520.

Figure 6:
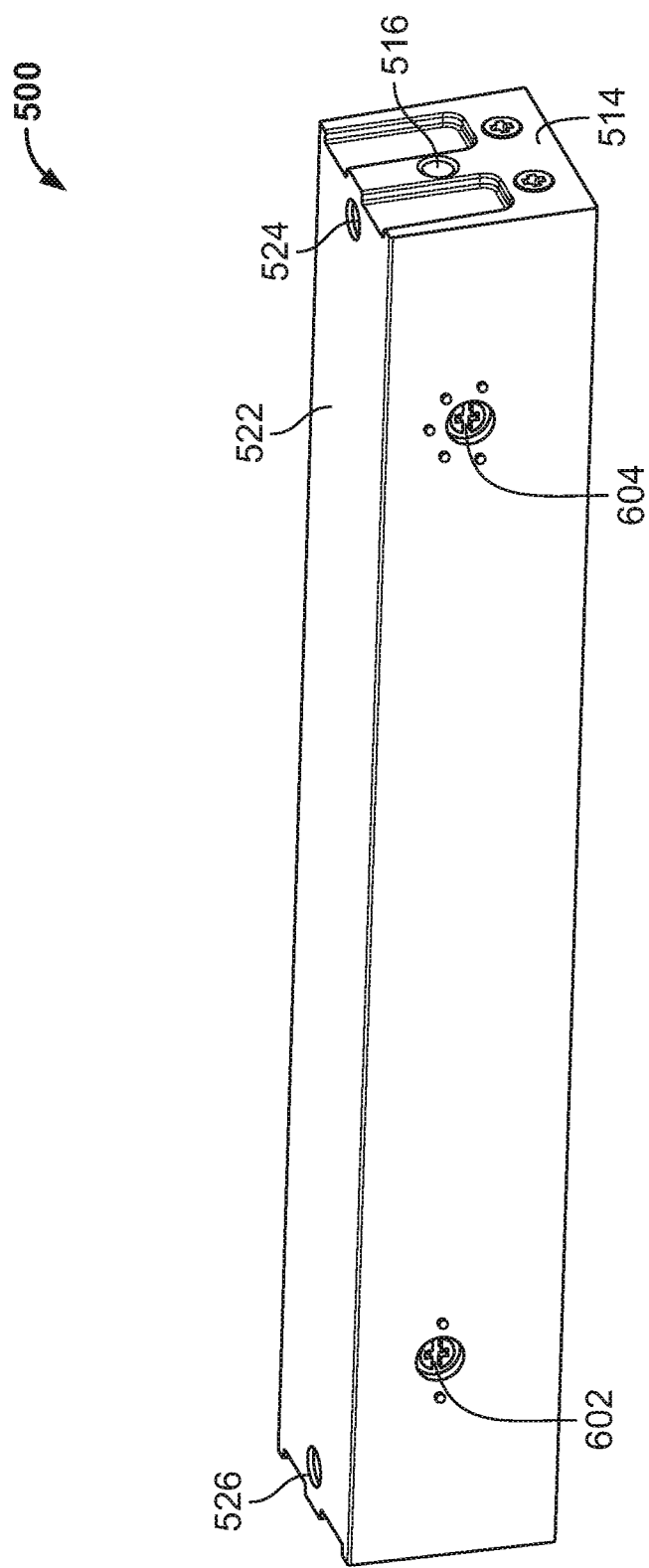
FIG. 6 shows illustrative apparatus in accordance with principles of the invention.

Fixture 500 may include top face 522 (shown in FIG. 6). Fixture 500 may include end face 528 (shown in FIG. 14).

Fixture 500 may include back face 525. Back face 525 may have a height h. Midline 527 may traverse back face 525 at a height h/2. When mounted on a mount such as 102, midline 527 may be disposed at an offset from face F (shown in FIG. 2). The offset may be defined as an average displacement of midline 527 from F, over the length of midline 527. Table 2 lists illustrative offset ranges.

| Illustrative offset ranges (mm) | |
| --- | --- |
| Lower | Upper |
| 0 | 1 |
| 1 | 2 |
| 2 | 3 |
| 3 | 4 |
| 4 | 5 |
| 5 | 6 |
| 6 | 7 |
| 7 | 8 |
| 8 | 9 |
| 9 | 10 |
| 10 | 11 |
| 11 | 12 |
| 12 | 13 |
| 13 | 14 |
| 14 | 15 |
| 15 | 16 |
| 16 | 17 |
| 17 | 18 |
| 18 | 19 |
| 19 | 20 |
| 20 | 21 |
| 21 | 22 |
| 22 | 23 |
| 23 | 24 |
| 24 | 25 |
| 25 | 26 |
| Other suitable lower limits | >26 Other suitable upper limits |

FIG. 6 shows fixture 500. Fixture 500 may include CCT control 602. CCT control 602 may be mechanically adjusted by a user when fixture 500 is installed in hardscape Ha (shown in FIG. 1). Adjustment of control 602 may adjust a CCT of the LED light. Fixture 500 may include intensity control 604. Intensity control 604 may be mechanically adjusted by a user when fixture 500 is installed in hardscape Ha (shown in FIG. 1). Adjustment of control 604 may adjust an intensity of the LED light.

Top face 522 may include mounting hole 524. Mounting hole 524 may be opposite mounting hole 518 (shown in FIG. 5). Mounting hole 524 may be continuous with mounting hole 518 to form a through-hole through housing 502. Top face 522 may include mounting hole 526. Mounting hole 526 may be opposite mounting hole 520 (shown in FIG. 5). Mounting hole 526 may be continuous with mounting hole 520 to form a through-hole through housing 502.

One or more of the mounting holes in housing 502 may include interior threads for engagement of a fastener. One or more of the mounting holes in housing 502 may be sized for clearance of the fastener. The fastener may include a screw. The fastener may include a bolt.

Figure 7:
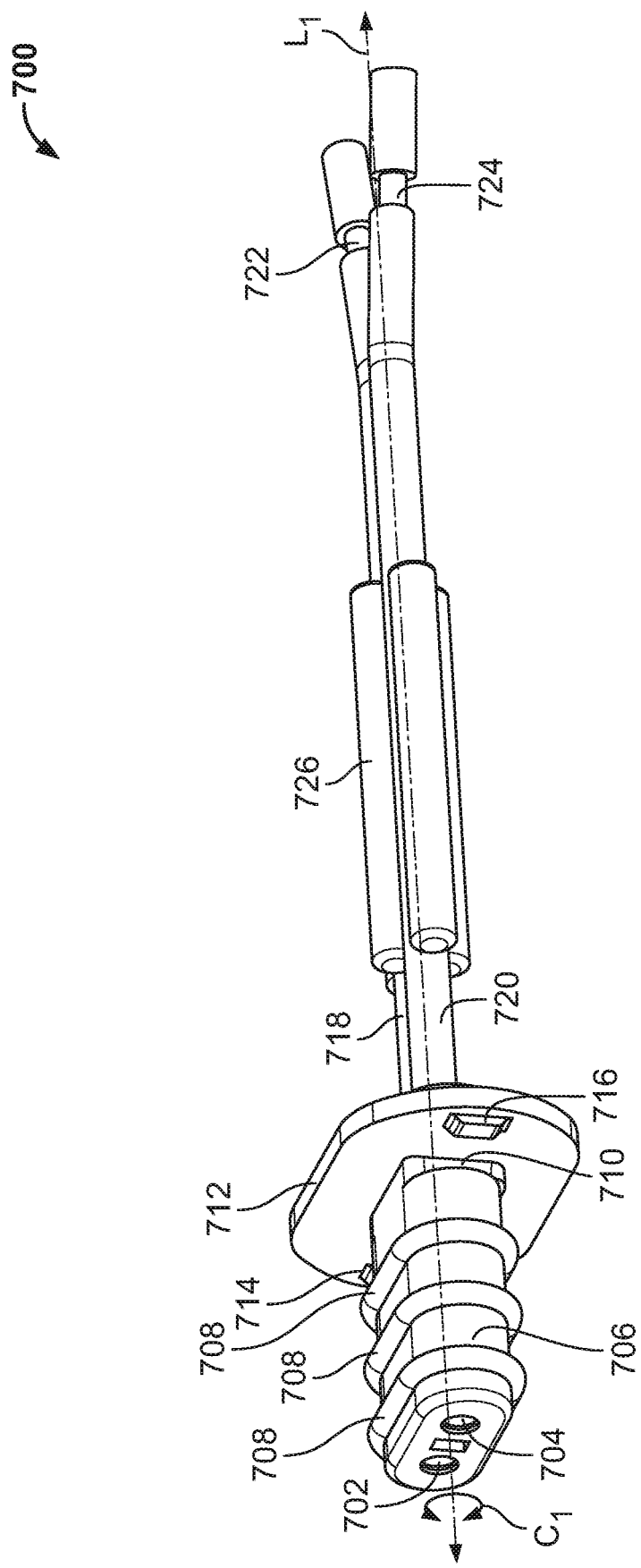
FIG. 7 shows illustrative apparatus in accordance with principles of the invention.

FIG. 7 shows illustrative connector 700. Connector 700 may include electrical terminal 702. Connector 700 may include electrical terminal 704. Terminals 702 and 704 may be configured to engage terminals 508 and 510 (shown in FIG. 5). Connector 700 may include casing 706. Casing 706 may encase terminals 702 and 704. Casing 706 may form a watertight seal against terminals 702 and 704. Casing 706 may be configured to mate with receptacle 506 (shown in FIG. 5). Casing 706 may form a watertight seal with receptacle 506.

Casing 706 may include one or more rings 708. Rings 708 may be disposed in grooves (not shown) in casing 706. Mating of casing 706 with receptacle 506 may compress rings 708 to form a watertight seal between casing 706 and receptacle 506.

Connector 700 may include groove 710. Groove 710 may engage a mount such as mount 102 (shown in FIG. 1). Groove 710 may interfere with or prevent motion, along longitudinal axis $L_1$, of connector 700 relative to a mount such as mount 102. Connector 700 may include flange 712. Flange 712 may interfere with or prevent motion, along longitudinal axis $L_1$, of connector 700 relative to a mount such as mount 102.

Flange 712 may include bosses 714 and 716. Bosses 714 and 716 may interfere with or prevent motion, circumferentially, in directions $C_1$, about axis $L_1$, or linearly in a direction orthogonal to axis $L_1$, of connector 700 relative to a mount such as mount 102 when connector 700 is engaged with mount 102.

Connector 700 may include electrically insulated leads 718 and 720. Leads 718 and 720 may include, respectively, conductors 722 and 724, which may be, respectively, in electrical communication with terminals 702 and 704. One or both of leads 718 and 720 may include a reinforcement such as reinforcement 726.

Figure 8:
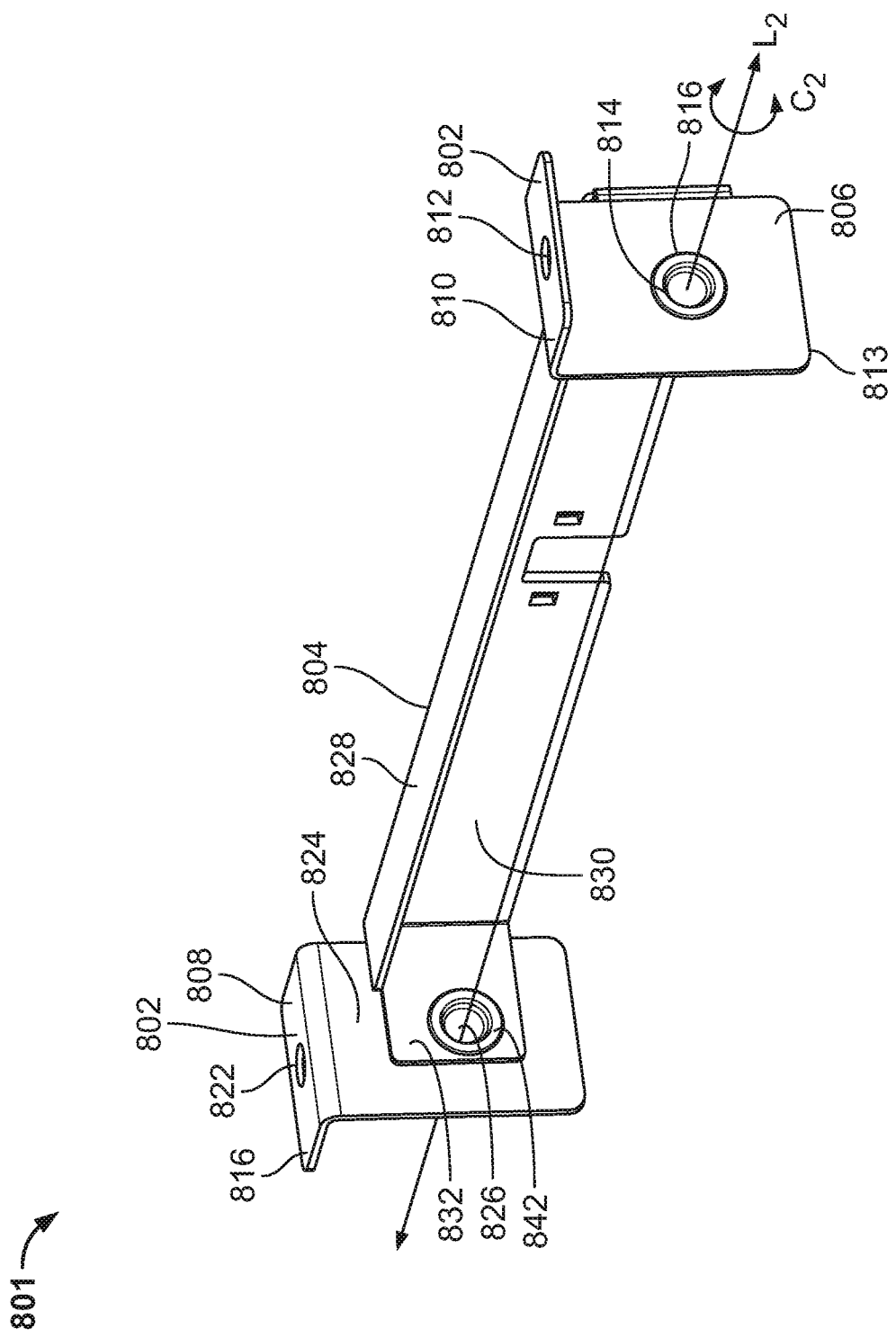
FIG. 8 shows illustrative apparatus in accordance with principles of the invention.

FIG. 8 shows illustrative mount 801. Illustrative mount 801 may have one or more features in common with mount 102 (shown in FIG. 1). Mount 801 may include anchor 802. Mount 800 may include support 804.

Anchor 802 may include clip 806. Anchor 802 may include clip 808.

Clips 806 and 808 may be secure support 804 relative to a hardscape face, such as underside U (shown in FIG. 2).

Clip 806 may include first arm 810. First arm 810 may include mounting hole 812. First arm 810 may be positioned against underside U. A fastener may be passed through mounting hole 812 into underside U. Clip 806 may include second arm 813. Second arm 813 may include mounting hole 814.

Clip 808 may include first arm 816. First arm 816 may include mounting hole 822. First arm 816 may be positioned against underside U. A fastener may be passed through mounting hole 822 into underside U. Clip 808 may include second arm 824. Second arm 824 may include mounting hole 826.

Support 804 may include top projection 828. Support 804 may include brace 830. Support 804 may include end projection 832. Support 804 may include end projection 834 (shown in FIG. 9). End projection 832 may include mounting hole 836 (shown in FIG. 9). End projection 834 may include mounting hole 838 (both shown in FIG. 9).

Top projection 828, brace 830, end projection 832 and end projection 834 may receive the fixture.

Slide grommet 840 may join second arm 813 to end projection 836 in a manner that allows end projection 836 to rotate, relative to second arm 813, in directions $C_2$ about axis $L_2$.

Slide grommet 840 may include two rings connected by a bushing. The bushing may be rigidly fixed to one of the rings, and may include a bearing surface upon which the other ring slides. The bushing may pass through mounting hole 838 in support 804, and through mounting hole 814 in second arm 813. The bearing surface may provide sufficient friction to hold support 804 at any attitude to which a user sets support 804. The friction may be sufficient to hold support 804 when fixture 500 is mounted on support 804. A fastener (not shown) may be passed through slide grommet 840 into mounting hole 516 of housing 502 to mount fixture 500 to support 804 and to underside U.

Slide grommet 842 may join second arm 824 to end projection 832 in a manner that allows end projection 832 to rotate in directions $C_2$ about axis $L_2$ relative to second arm 824.

Slide grommet 842 may include two rings connected by a bushing. The bushing may be rigidly fixed to one of the rings, and may include a bearing surface upon which the other ring slides. The bushing may pass through mounting hole 837 in support 804, and through mounting hole 826 in second arm 824. The bearing surface may provide sufficient friction to hold support 804 at any attitude to which a user sets support 804. The friction may be sufficient to hold support 804 when fixture 500 is mounted on support 804. A fastener (not shown) may be passed through slide grommet 842 into a mounting hole (in the end of housing 502 that is opposite mounting hole 516) to mount fixture 500 to support 804 and to underside U.

The bearing surfaces of slide grommets 840 and 842 may together provide sufficient friction to hold support 804 at any attitude to which a user sets support 804. The friction may be sufficient to hold support 804 when fixture 500 is mounted on support 804.

The fixture may be secured to support 804 by passing fasteners through mounting holes 822 and 812 into corresponding mounting holes 516 (shown in FIG. 5) and a mounting hole (not shown) in an end of housing 502 opposite that including mounting hole 516.

Figure 9:
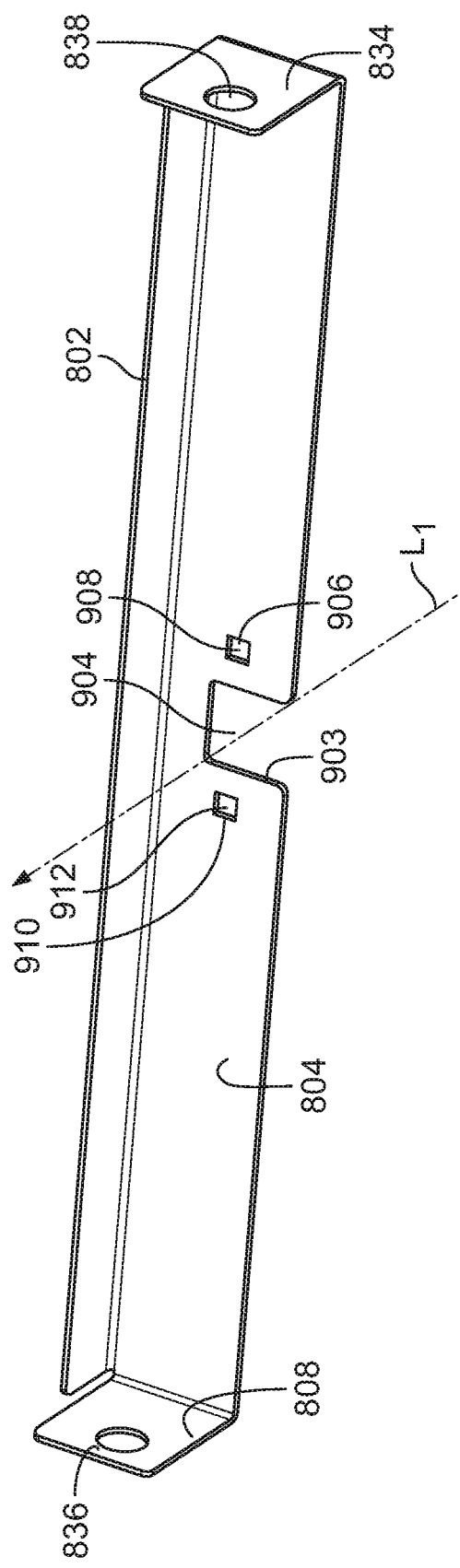
FIG. 9 shows illustrative apparatus in accordance with principles of the invention.

FIG. 9 shows support 804. Axis $L_1$, defined in FIG. 7, is overlain on support 804.

Brace 830 of support 804 may include edge 903. Edge 903 may define connector casing recess 904. Brace 830 may include edge 906. Edge 906 may define recess 908. Brace 830 may include edge 910. Edge 910 may define recess 912. Edge 903 may be engaged by groove 710 (shown in FIG. 7). Edges 906 and 910 may interfere, respectively, with bosses 714 and 716 (shown in FIG. 7).

Figure 10:
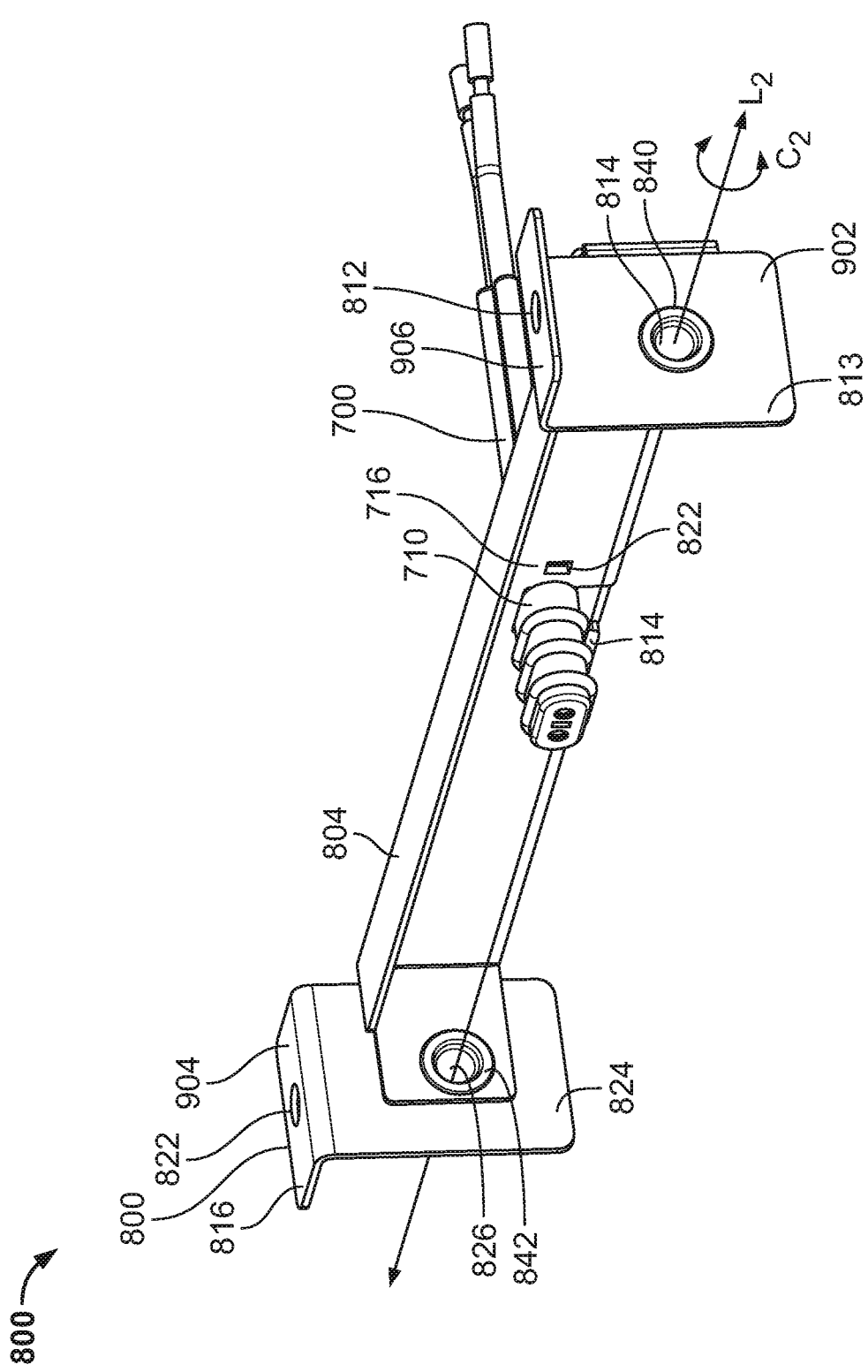
FIG. 10 shows illustrative apparatus in accordance with principles of the invention.

FIG. 10 shows connector 700 installed in mount 800. Groove 710 is engaged with edge 903. Boss 716 is positioned in recess 908. Boss 714 (shown in FIG. 7) is positioned in recess 904 (shown in FIG. 9).

Figure 11:
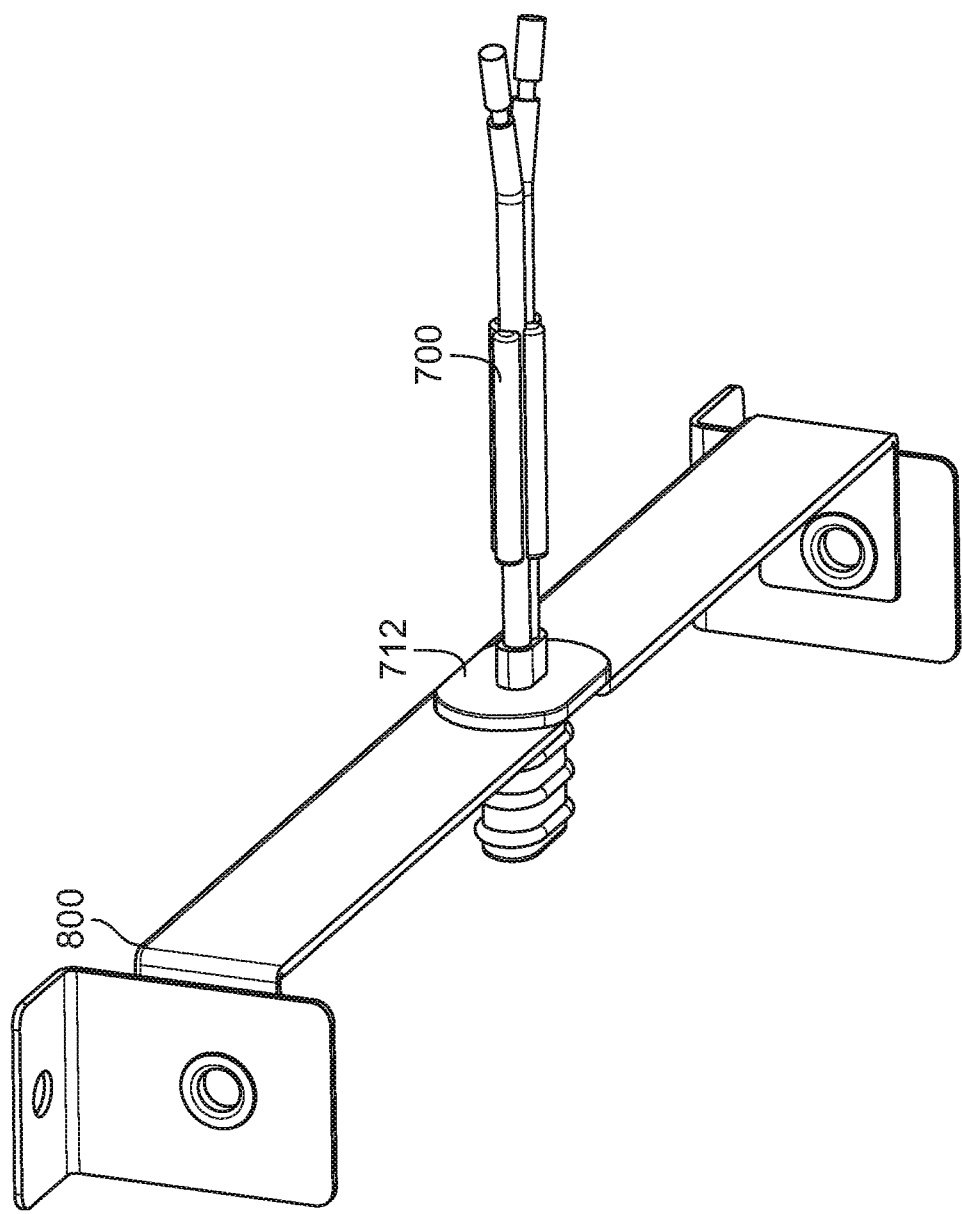
FIG. 11 shows illustrative apparatus in accordance with principles of the invention.

FIG. 11 shows that flange 712 may be in flush contact with brace 830 when groove 710 (shown in FIG. 7) is engaged with edge 903.

Figure 12:
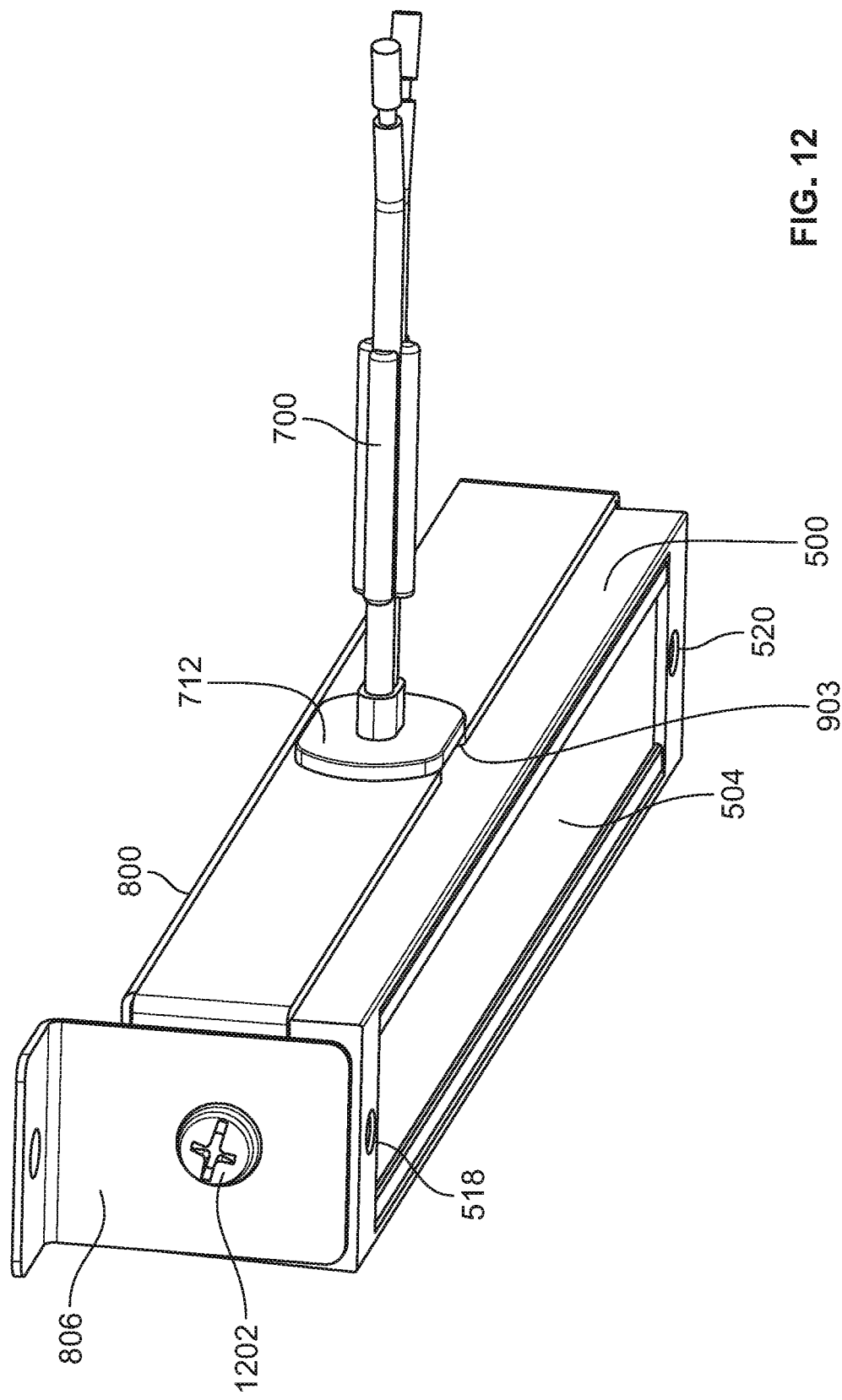
FIG. 12 shows illustrative apparatus in accordance with principles of the invention.

FIG. 12 shows fixture 500 mounted to support 804. Fastener 1202 may fasten clip 902 to fixture 500. A fastener (1404, shown in FIG. 14) may fasten clip 806 to fixture 500.

Figure 13:
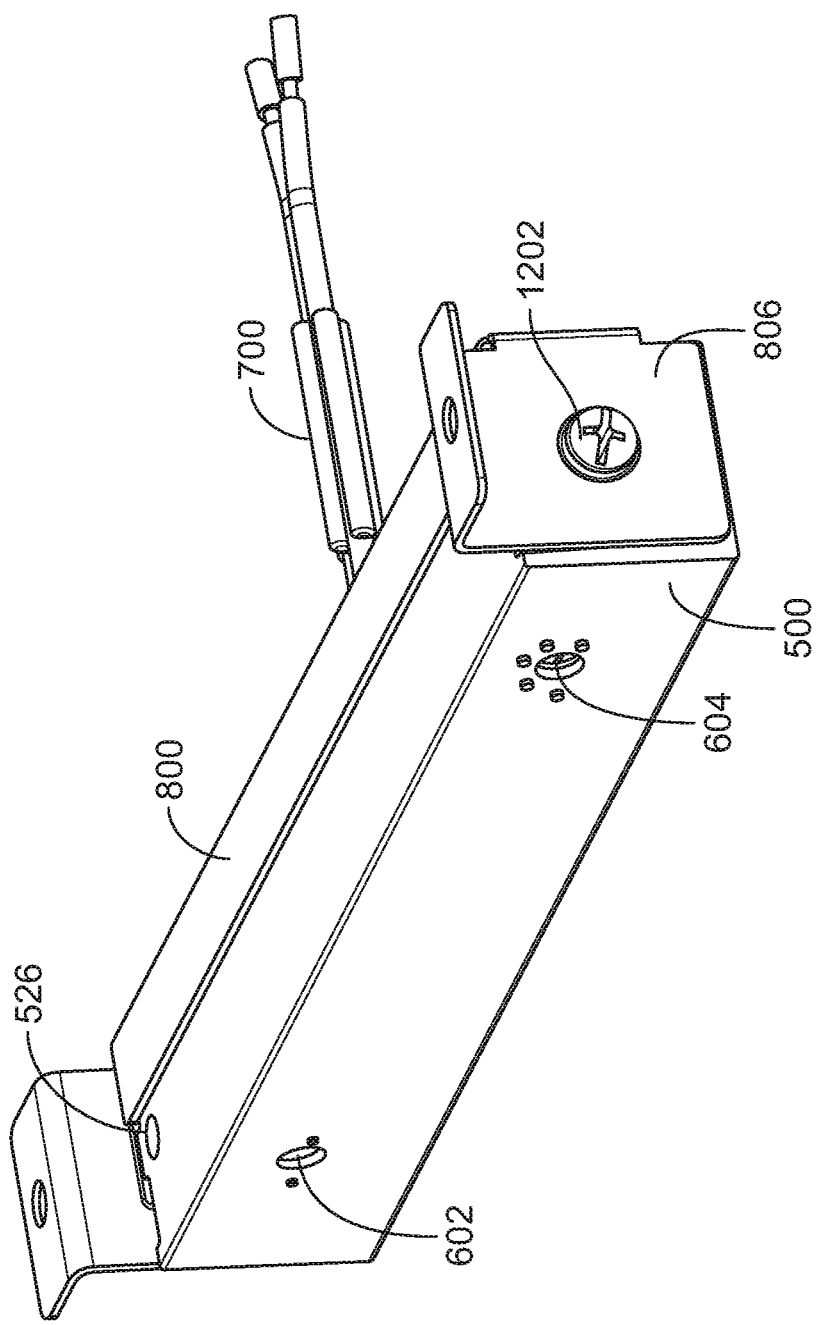
FIG. 13 shows illustrative apparatus in accordance with principles of the invention.

FIG. 13 shows that controls 602 and 604 may be accessible when fixture 500 is mounted in mount 800.

Figure 14:
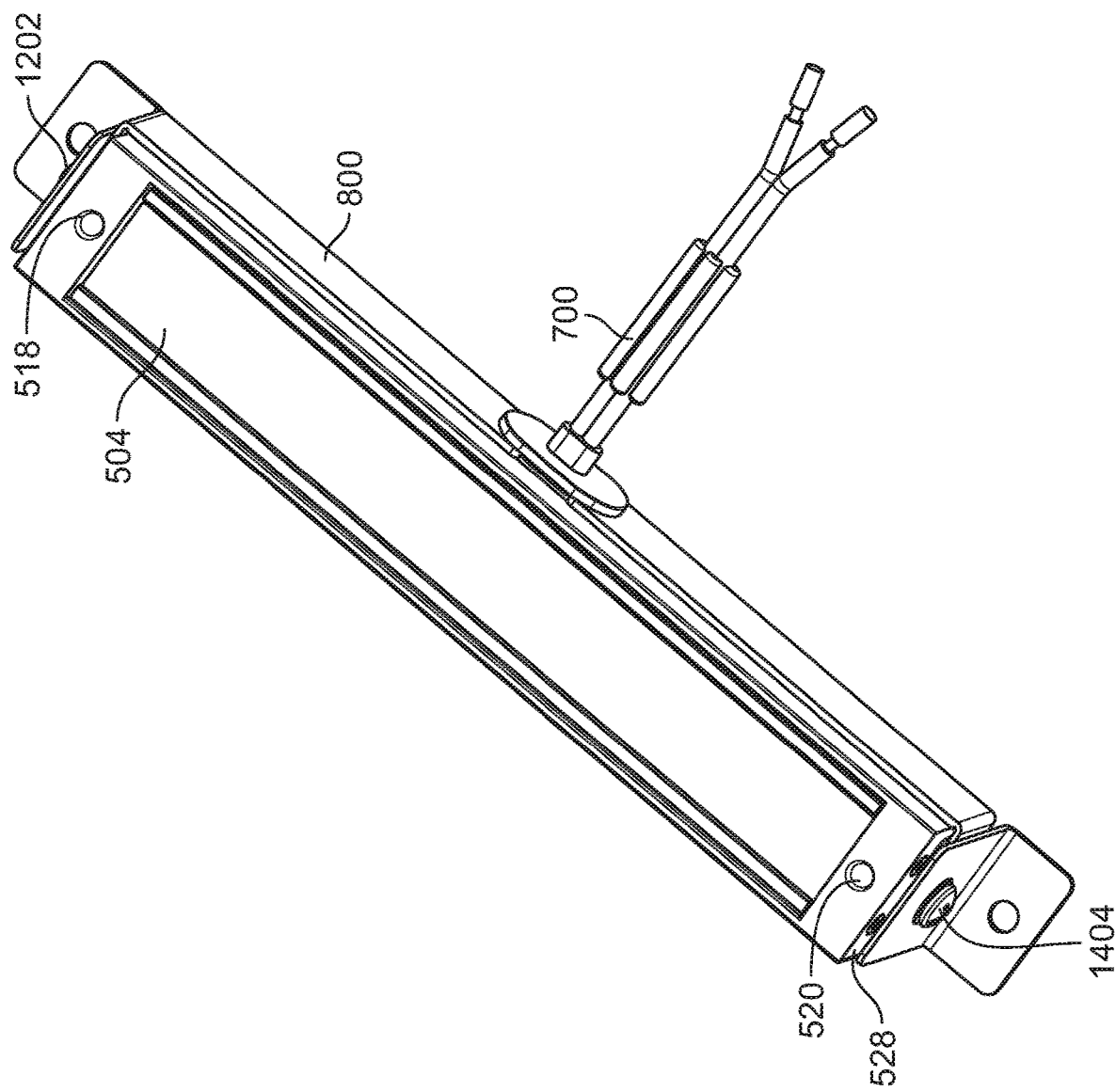
FIG. 14 shows illustrative apparatus in accordance with principles of the invention.

FIG. 14 shows that fastener 1404 may be passed through sliding grommet 842 into a mounting hole in fixture 500 at an opposite end of fixture 500 from that in which mounting hole 516 is disposed.

Figure 15:
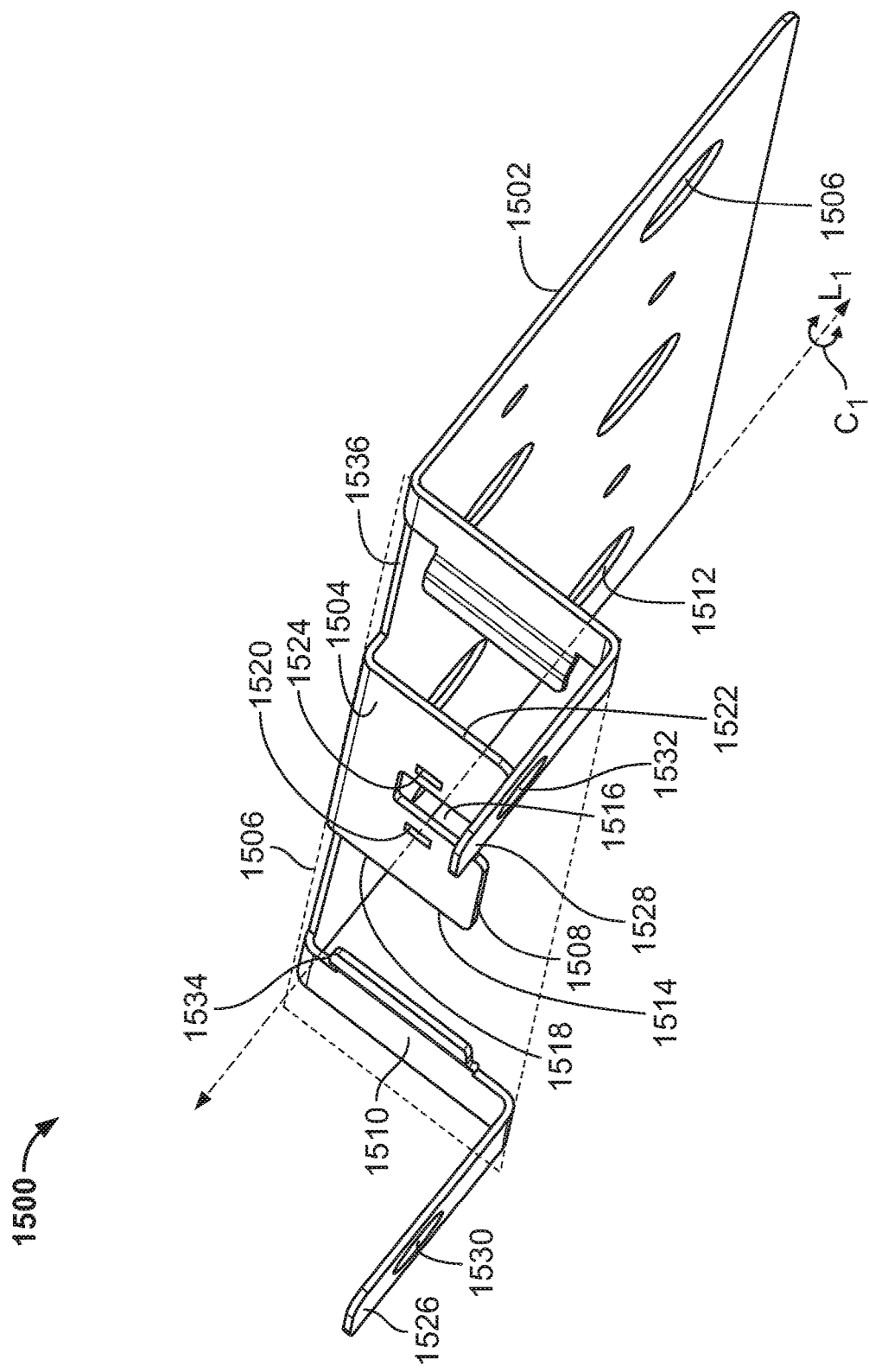
FIG. 15 shows illustrative apparatus in accordance with principles of the invention.

FIG. 15 shows illustrative mount 1500. Illustrative mount 1500 may have one or more features in common with mount 102 (shown in FIG. 1). Mount 1500 may include anchor 1502. Mount 1500 may include support 1504. $L_1$, defined in FIG. 7, is shown in an orientation corresponding to a state in which connector 700 is engaged with mount 1500. Mount 1500 may support a fixture such as fixture 104 (shown in FIG. 1).

Anchor 1502 may include bonding holes such as 1506. Anchor 1502 may be secured between first course $C_1$ and second course $C_2$ of masonry M (shown in FIG. 2). Anchor 1502 may secure support 1504 relative to a hardscape face, such as face F (shown in FIG. 2).

Support 1504 may include brace 1506. Brace 1506 may include bracket 1508. Brace 1506 may include leg 1510. Brace 1506 may include leg 1512. Brace 1506 may include edge 1514. Edge 1514 may define connector casing recess 1516. Brace 1506 may include edge 1518. Edge 1518 may define recess 1520. Brace 1506 may include edge 1522. Edge 1522 may define recess 1524.

Edge 1514 may be engaged by groove 710 (shown in FIG. 7). Edges 1518 and 1522 may interfere, respectively, with bosses 714 and 716 (shown in FIG. 7).

Support 1504 may include projection 1526. Support 1504 may include projection 1528. Projection 1526 may include mounting hole 1530. Projection 1528 may include mounting hole 1532.

Brace 1506, projection 1526 and projection 1528 may receive the fixture. The fixture may be secured to support 1504 by passing fasteners through mounting holes 1530 and 1532 into corresponding mounting holes 518 and 520 (shown in FIG. 5).

Brace 1506 may include bumper 1534. Brace 1506 may include bumper 1536. Bumpers 1534 and 1536 may be disposed in positive relief from one or more of bracket 1508, leg 1510 and leg 1512. Bumpers 1534 and 1536 may limit the proximity of the fixture to bracket 1508. The limit may be selected to prevent the fixture from displacing connector 700 from support 1504 when a user connects the fixture to connector 700 by pushing the fixture toward brace 1506. Bumpers 1534 and 1536 may be sufficiently stiff to provide the limit. Bumpers 1534 and 1536 may be sufficiently elastic to deform toward brace 1506 during connection of the fixture, and then, when a user stops pushing the fixture, provide tension to connector 700 to drawn connector 700 towards bumpers 1534 and 1536. This may increase friction between connector 700 and brace 1506.

Figure 16:
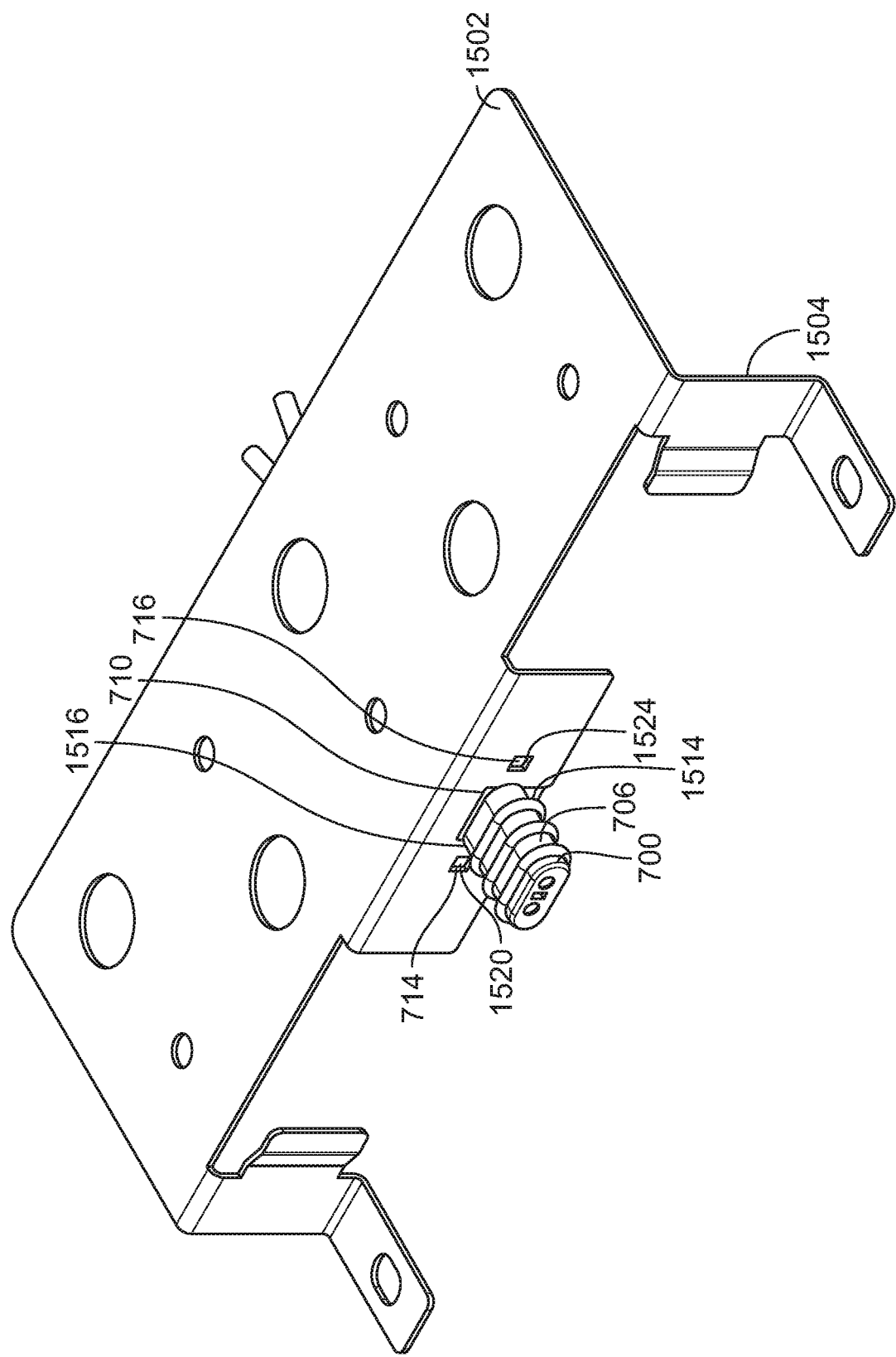
FIG. 16 shows illustrative apparatus in accordance with principles of the invention.

FIG. 16 shows connector 700 installed in mount 800. Connector casing 706 is seated in recess 1516. Groove 710 is engaged with edge 1514. Boss 714 is positioned in recess 1520. Boss 716 is positioned in recess 1524.

Figure 17:
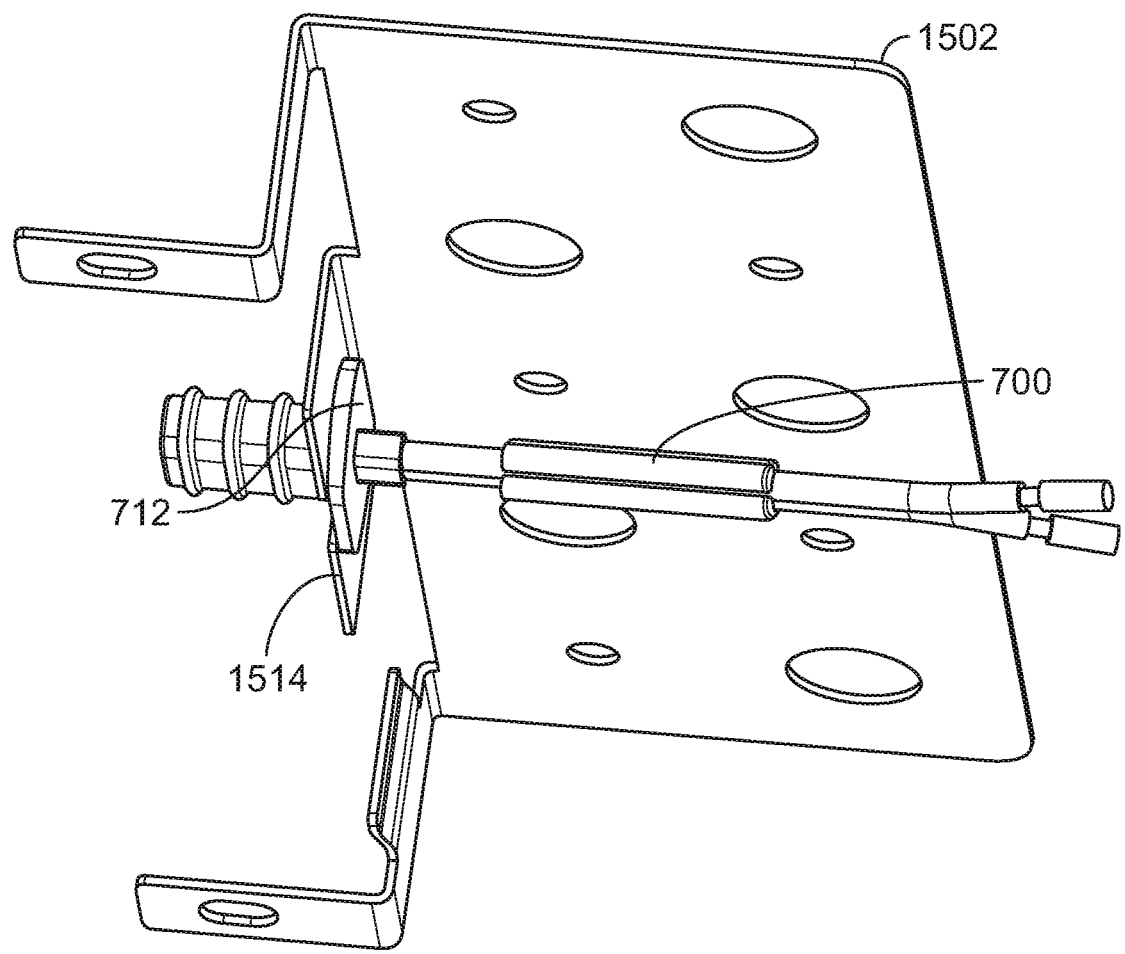
FIG. 17 shows illustrative apparatus in accordance with principles of the invention.

FIG. 17 shows a view of the apparatus shown in FIG. 16 from a different angle. Flange 712 may be in flush contact with brace 1506 when groove 710 (shown in FIG. 7) is engaged with edge 1514.

Figure 18:
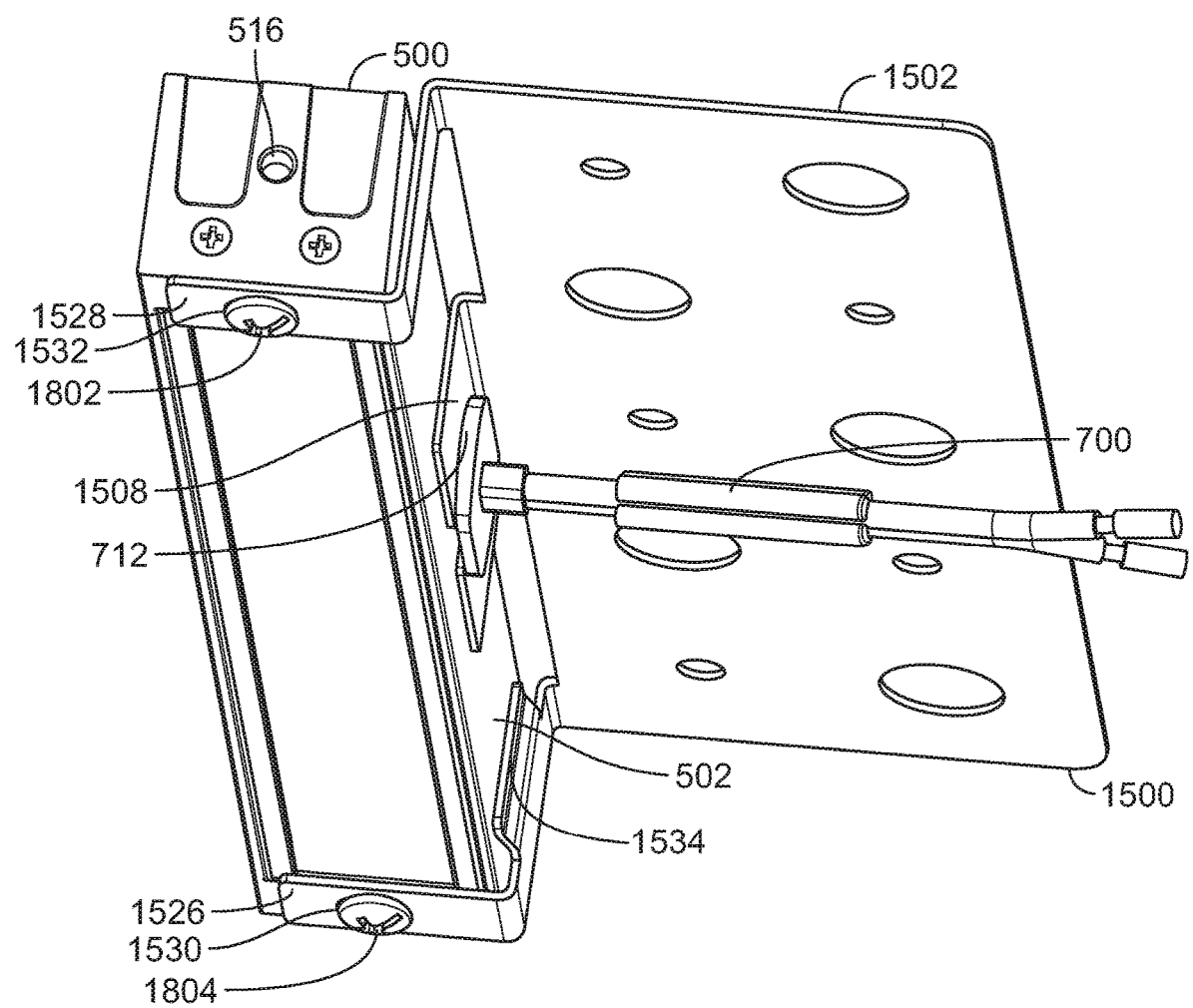
FIG. 18 shows illustrative apparatus in accordance with principles of the invention.

FIG. 18 shows fixture 500 mounted to support 1504 and connected with connector 700, which is installed in mount 1500. Fastener 1802 may pass through mounting hole 1532 in projection 1528 to engage mounting hole 518 in fixture 500. Fastener 1804 may pass through mounting hole 1530 in projection 1526 to engage mounting hole 520 in fixture 500. bumper 1534 may be in contact with housing 502.

Figure 19:
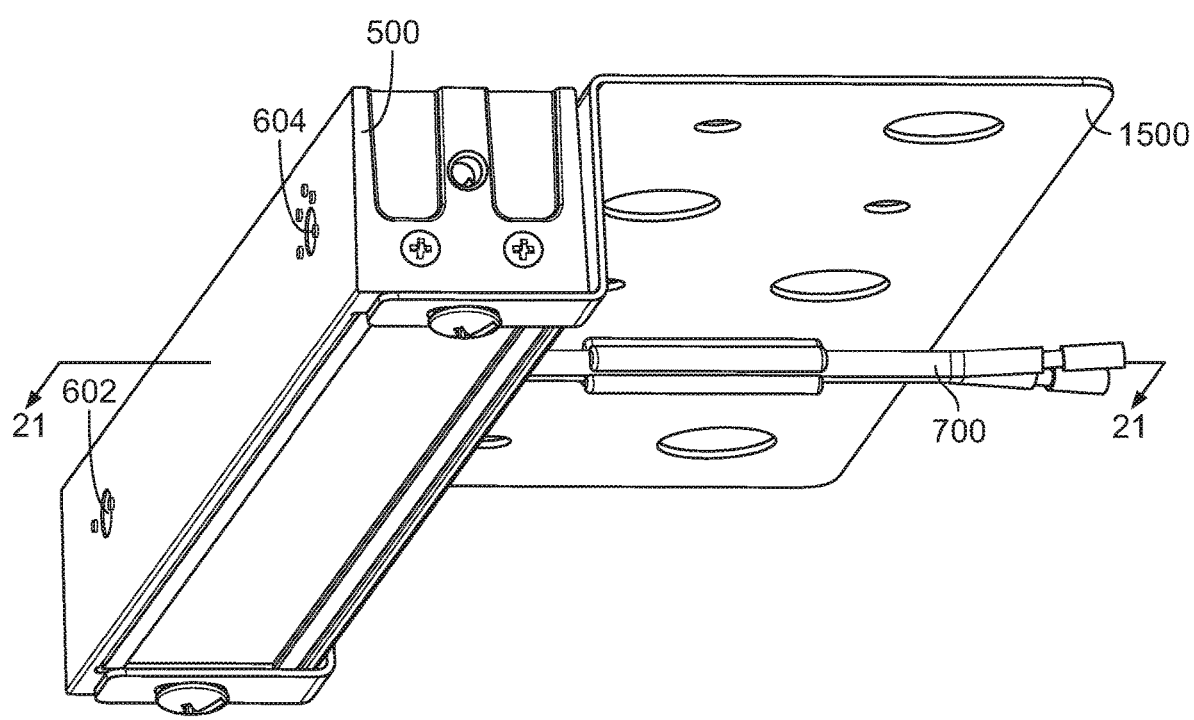
FIG. 19 shows illustrative apparatus in accordance with principles of the invention.

FIG. 19 shows a view of the apparatus shown in FIG. 18 from a different angle. Controls 602 and 604 may be accessible when fixture 500 is mounted in mount 1500.

Figure 20:
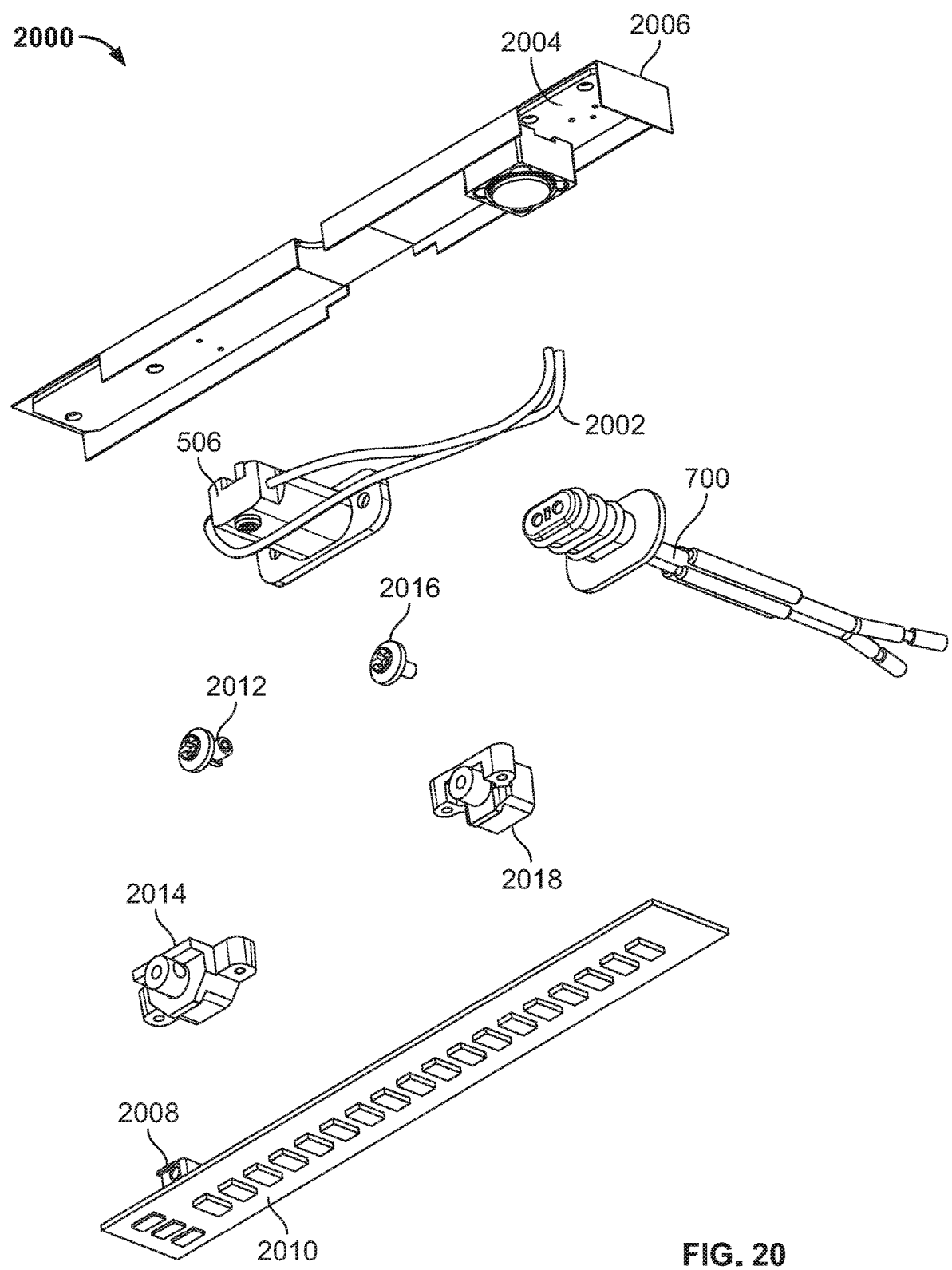
FIG. 20 shows illustrative apparatus in accordance with principles of the invention.

FIG. 20 shows illustrative components 2000 of a fixture such as fixture 500. Connector 700 may be connected to or integrated into an end of a powerline such as powerline P (shown in FIG. 1). Connector 700 may be mated to receptacle 506. Leads 2002 may provide power to driver circuit board 2004 on channel 2006. Terminal 2008 may provide the power to light source 2010. Light source 2010 may include one or more LED emitters.

Driver circuit board 2004 may be in electrical communication with color temperature change switch 2012. Switch 2012 may be actuated by color temperature change switch actuator assembly 2014. Assembly 2014 may include control 602, which may be mechanically accessible from outside of housing 502.

Driver circuit board 2004 may be in electrical communication with dimmer circuit 2016. Dimmer circuit 2016 may be actuated by dimming dial actuator assembly 2018. Assembly 2014 may include control 604, which may be mechanically accessible from outside of housing 502.

Figure 21:
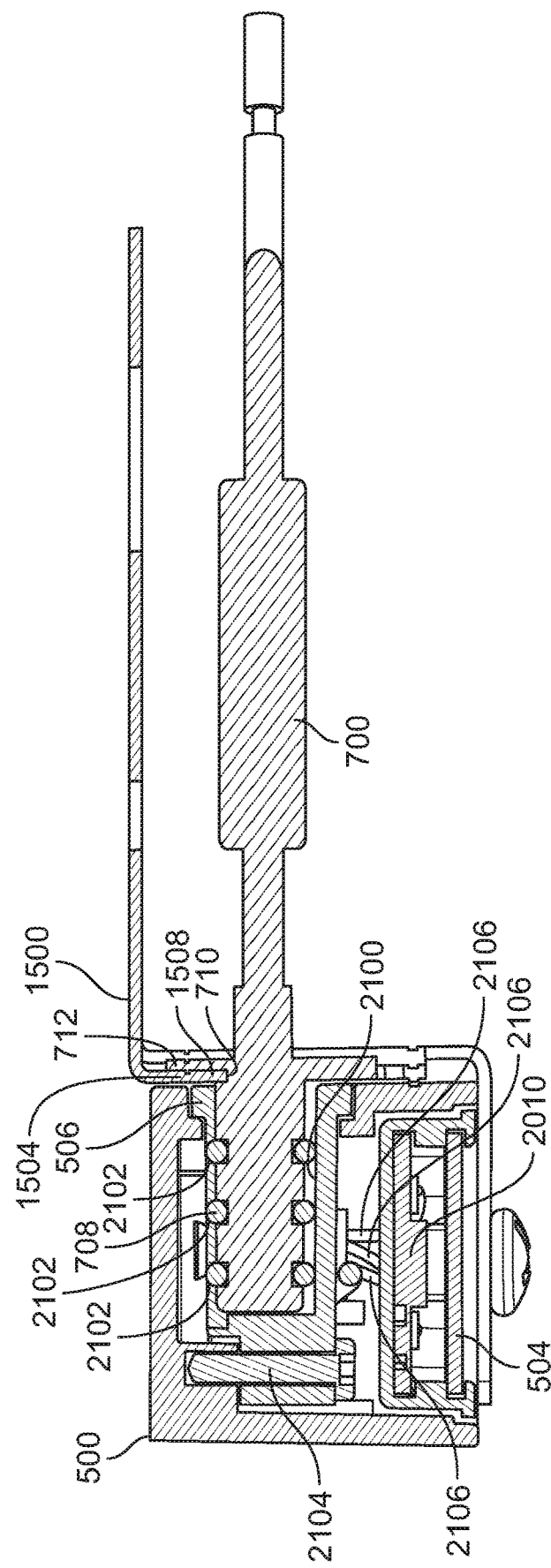
FIG. 21 shows a partial cross-sectional view taken along lines 21-21 (shown in FIG. 19).

FIG. 21 shows is a partial cross section of the apparatus shown in FIG. 19. Rings 708 may form a watertight seal against inner wall 2100 of receptacle 506. Wall 2100 may include recesses 2102 to receive rings 708. Recesses 2102 may releasably capture connector 700 when rings 708 expand into recesses 2102. Rings 708 may deform to allow receptacle 506 to release connector 700. Groove 710 may be engaged with edge 1514. Flange 712 may be disposed flush against bracket 1508. Fastener 2104 may secure receptacle 506 in place.

Leads 2106 may provide power from driver circuit board 2004 to light source 2010. Panel 504 may protect light source 2010. Panel 504 may diffuse light from light source 2010.

Thus, apparatus and methods for deploying a fixture have been provided. Persons skilled in the art will appreciate that the present invention can be practiced by other than the described examples, which are presented for purposes of illustration rather than of limitation. The present invention is limited only by the claims that follow.

What is claimed is:

1. Apparatus comprising:
    a fixture comprising a first electrical terminal;
    an anchor configured to be secured to a hardscape;
    a support that is configured to hold the fixture; and
    a connector that:
        has a second electrical terminal; and
        is configured to hold the second electrical terminal in a fixed position relative to the support during disconnection of the second electrical terminal from the first electrical terminal.

2. The apparatus of claim 1 wherein the connector:
    has a longitudinal axis defining a direction; and
    includes a detent that is configured to prevent, in operation, the connector from being displaced, relative to the support, along the axis.

3. The apparatus of claim 1 wherein:
    the hardscape includes masonry; and
    the anchor is configured to be secured, at the masonry, to the masonry.

4. The apparatus of claim 3 wherein deinstallation of the fixture does not require de-securing the anchor from the masonry.

5. The apparatus of claim 3 wherein the anchor is configured to be secured to the masonry between a first course and a second course.

6. The apparatus of claim 5 wherein the support includes a brace that:
is fixed to the anchor;
is configured to be disposed along a face of the second course; and
defines an opening that is configured to receive the connector.

7. The apparatus of claim 5 wherein the support includes a fixture shelf that;
is fixed to the anchor; and
is configured to extend away from a face of the second course.

8. The apparatus of claim 3 wherein:
the masonry has an external surface; and
the anchor is configured to be secured, at the external surface, to the external surface.

9. The apparatus of claim 8 wherein:
the masonry includes a first course; and
the external surface includes an underside of the first course.

10. The apparatus of claim 9 wherein:
the support includes a support end; and
the anchor includes a clip that is configured to retain the support end relative to the external surface.

11. The apparatus of claim 10 wherein the clip includes:
a first arm; and
a second arm;
wherein:
the second arm:
is fixed to the first arm; and,
in operation, extends between the underside and the support end; and
the support end is rotatable relative to the second arm.

12. The apparatus of claim 1 wherein the connector includes a male portion that is configured to plug in to a female portion defined by the first electrical terminal of the fixture.

13. The apparatus of claim 1 wherein connection of the connector with the fixture forms a watertight enclosure of the first electrical terminal.

14. The apparatus of claim 13 wherein the connector includes:
a casing defining a groove; and
an elastomeric ring disposed in the groove.

15. The apparatus of claim 13 wherein:
the connector defines a groove that is configured to engage the support; and
engagement of the groove with the support retains the position.

16. The apparatus of claim 1 wherein:
the hardscape includes ground; and
the anchor is configured to be secured, at the ground, to the ground.

17. The apparatus of claim 1 wherein the support:
defines a rotational axis; and
is configured to be rotated, about the rotational axis, to different positions.

18. The apparatus of claim 17 wherein:
for each of the positions, there is a corresponding attitude of the fixture; and
the support is configured to hold the fixture at the attitude.

19. The apparatus of claim 1 wherein the support defines an opening that is configured to receive the connector.

20. The apparatus of claim 1 wherein the fixture is a light fixture.

21. The apparatus of claim 1 wherein the connector is configured to be releasably connected to the first electrical terminal.

22. Apparatus comprising:
an electrical terminal;
an electrical conductor in electrical communication with the terminal;
a sealed casing that:
encases an end of the conductor; and
exposes the terminal for electrical engagement with a fixture; and
a flange that is configured to retain the terminal at a fixed distance from a support during disassembly of the fixture from the support.

23. The apparatus of claim 22 wherein the casing is configured to be releasably connected to the fixture.

24. The apparatus of claim 22 wherein the flange and the casing define a groove that is configured to:
receive the support; and
secure the terminal at the distance.

25. The apparatus of claim 24 wherein the flange and the casing are further configured to releasably engage the terminal with the support.

26. The apparatus of claim 25 wherein:
the casing defines a first direction along which the casing is configured to engage the fixture;
the distance is defined as being along the first direction; and
the flange and casing are releasable from the support along a second direction that is not parallel to the first direction.

27. The apparatus of claim 26 wherein the second direction is perpendicular to the first direction.

28. The apparatus of claim 22 further comprising a sealing ring configured to form a watertight enclosure of the electrical terminal.

29. The apparatus of claim 22 wherein the casing defines a recess in which the ring is configured to be disposed.

30. The apparatus of claim 22 further including includes a detent that is configured to prevent the flange from being rotated relative to the support about an axis along which the casing is configured to engage the fixture.

* * * * *